(12) United States Patent
Masfaraud

(10) Patent No.: US 8,754,561 B2
(45) Date of Patent: Jun. 17, 2014

(54) ROTOR FOR ROTARY ELECTRIC MACHINE WITH REDUCED-MASS INTERPOLAR STRUCTURES

(75) Inventor: Julien Masfaraud, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 394 days.

(21) Appl. No.: 12/994,222

(22) PCT Filed: May 26, 2009

(86) PCT No.: PCT/FR2009/050977
§ 371 (c)(1),
(2), (4) Date: Feb. 1, 2011

(87) PCT Pub. No.: WO2010/000996
PCT Pub. Date: Jan. 7, 2010

(65) Prior Publication Data
US 2011/0127873 A1 Jun. 2, 2011

(30) Foreign Application Priority Data

Jun. 6, 2008 (FR) ..................................... 08 53745
Jun. 6, 2008 (FR) ..................................... 08 53755

(51) Int. Cl.
*H02K 21/12* (2006.01)
(52) U.S. Cl.
USPC .................................................. 310/156.66

(58) Field of Classification Search
USPC ............. 310/156.66, 156.69, 156.71, 156.72, 310/156.73, 263
See application file for complete search history.

(56) References Cited

U.S. PATENT DOCUMENTS

| 5,306,977 | A | 4/1994 | Hayashi |
| 5,483,116 | A * | 1/1996 | Kusase et al. ................. 310/263 |
| 5,747,913 | A | 5/1998 | Amlee et al. |
| 5,973,435 | A | 10/1999 | Irie et al. |
| 6,013,967 | A | 1/2000 | Ragaly et al. |
| 6,369,485 | B1 * | 4/2002 | Oohashi et al. ................ 310/263 |
| 7,784,168 | B2 * | 8/2010 | Ooiwa ............................ 29/598 |

FOREIGN PATENT DOCUMENTS

| FR | 2 770 347 | 4/1999 |
| FR | 2 865 322 | 7/2005 |
| FR | 2 895 165 | 6/2007 |
| GB | 2 308 017 | 6/1997 |
| JP | 60-148363 | 8/1985 |
| JP | 2006-74969 | 3/2006 |

* cited by examiner

*Primary Examiner* — Hanh Nguyen
(74) *Attorney, Agent, or Firm* — Berenato & White, LLC

(57) ABSTRACT

A rotor with poles in the form of claws, of a rotary electrical machine. This rotor comprises a plurality of interpolar magnetic assemblies. On a radial cross-sectional plane, a first total magnet surface of a section of the magnetic assembly is smaller than a second surface defined by the product of the radial height of a face (h) of the magnetic assembly (40) which faces towards the polar claw (44a), and the circumferential distance between the polar claws (44a, 44b) in the interpolar gap. The magnet has at least one recess which extends in an axial direction.

13 Claims, 5 Drawing Sheets

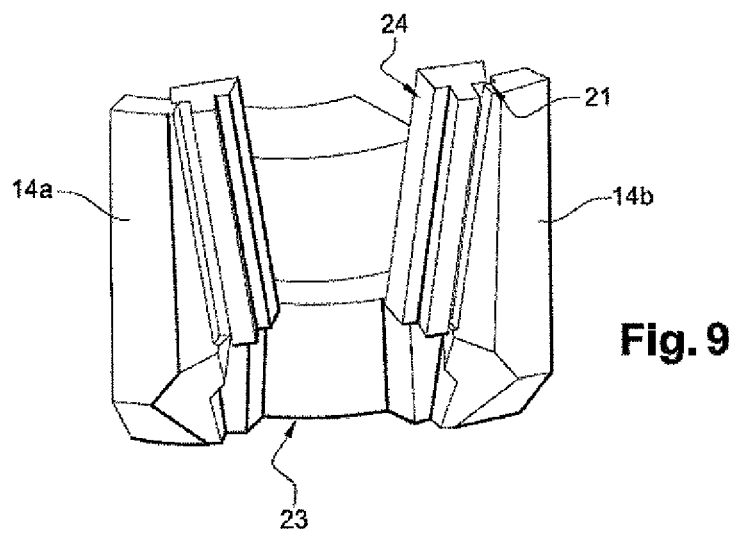
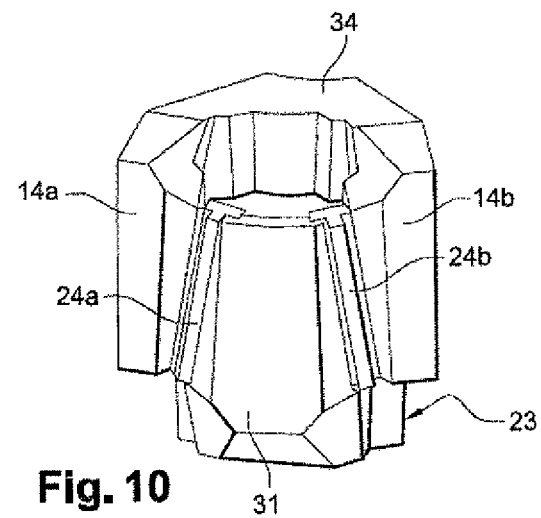

ROTOR FOR ROTARY ELECTRIC MACHINE WITH REDUCED-MASS INTERPOLAR STRUCTURES

FIELD OF THE INVENTION

The present invention relates in general to rotary electrical machines.

More particularly, the invention relates to rotary electrical machines of the alternator or alternator-starter type, which are designed for motor vehicles.

Even more particularly, the invention relates to rotary electrical machines, the rotor of which comprises one or a plurality of excitation coils, magnetic poles, and permanent magnets which are disposed between the magnetic poles. As a result of this arrangement, these magnets are known as interpolar magnets.

BACKGROUND OF THE INVENTION

Typically, the rotor has a claw-type structure. A structure of this type is constituted by two opposite, imbricated polar wheels, each comprising claws. Each claw of a polar wheel extends in the direction of the other polar wheel. In addition, each claw is inserted between two consecutive claws of the opposite polar wheel. Additionally, the rotor comprises magnetic parts, and the excitation coil is wound around the rotation shaft of the machine.

The rotor is located inside a stator. When the rotary machine is functioning, the rotor rotates around its axis, and a magnetic flow circulates between the adjacent magnetic poles with respective opposite polarities, by passing via the windings of the stator. The magnets which are disposed between the magnetic poles, constituted by the claws, are used to prevent the magnetic flow from passing directly from one pole to the other, without passing via the stator.

In fact, this leakage of flow from one pole to the other, without passing via the stator, affects the output, and detracts from the power performance of the rotary electrical machine. In fact, the flow which passes directly from one claw to the other without passing via the stator does not participate in the functioning of the machine. The use of interpolar magnets makes it possible to limit these leakages.

Interpolar magnets with a globally parallelepiped form are known. Each is placed between two adjacent claws of the rotor, each belonging respectively to one of the two polar wheels. These interpolar magnets are retained either by hooks, or by means of two grooves (or shoulders), each provided in one of the opposite lateral edges of the claws between which the magnet is situated.

In the first case, the magnets can have a reduced size, but they tend to move because of centrifugal force, since the hooks do not guarantee optimum securing.

In both cases, the magnets must have a volume which is sufficient to fill the entire interpolar gap, and they can be machined to have a rib which is designed to co-operate with the groove in the polar claws. This increases the cost of the machine, since these magnets are expensive.

In applications in which the rotary electrical machine must provide a high power density, the use of a large number of these magnets is essential.

Because of the cost of the raw material from which they are made, for example rare earths or ferrite, these interpolar magnets represent a substantial part of the cost of the rotor. Consequently, their design needs to be improved. In particular, it is necessary to optimise their geometric form in order to ensure that all of the mass of the magnet is useful for its functions, whilst guaranteeing good mechanical strength.

SUMMARY OF THE INVENTION

The object of the invention is to provide a rotor with interpolar magnetic assemblies comprising magnets, which have both a reduced size, and are secured in lateral grooves (or shoulders) of the polar claws.

The rotor according to the invention is a rotor of a rotary electrical machine, which is designed to be able to rotate around an axis, and around which a stator can be provided. This rotor comprises two polar wheels, each of which has a series of polar claws which extend according to an axial direction. These claws have a cross-section on a plane perpendicular to the axis which is substantially trapezoidal, and extend from an outer radial end of the polar wheel, in the direction of the other polar wheel. The polar wheels are arranged such that each claw of a polar wheel is situated between two consecutive polar claws of the other polar wheel. The rotor additionally comprises magnetic assemblies which are arranged respectively in the interpolar gaps, and which each comprise at least one magnet. On a radial cross-sectional plane, the rotor has a first total magnet surface of a section of the magnetic assembly which is smaller than a second surface defined by the product of the radial height of a face of the magnetic assembly which faces the claw, and the circumferential distance between the polar claws in the interpolar gap. It is characterised in that the magnet has a first recess which extends in an axial direction.

Thus, it is possible to reduce the mass of magnet necessary to limit the leakages of magnetic flow between the polar claws. In fact, whilst maintaining dimensions of the magnetic assembly which permit good contact with the claws, there is elimination of the volume of magnet which would not be useful. It is thus possible to assure the same functions with a reduced mass of magnet.

The magnet comprises a projection which extends radially in the interpolar gap beyond the groove, towards an outer radial end of the rotor, without going beyond the radial level of the outer face of the polar claws. The creation of grooves (or shoulders) means that a part of the claw in which the groove is provided is directly opposite the adjacent claw, without being exposed to the magnet. This part is the outer radial part of the claw, and is commonly known as the "lip". Despite the presence of interpolar magnets, leakages of magnetic flow persist between the respective lips of two adjacent claws of the rotor. Thus, the magnetic assembly creates a magnetic obstacle to the direct passage of a magnetic flow between the lips formed by the grooves of two adjacent claws of the rotor, i.e. without passing via the stator. The projection returns the magnetic flow in the direction of the stator. This makes it possible to make this flow participate in the flow induced in the windings of the stator of the rotary electric machine, and consequently improves its output.

The magnet can have a circumferential width of between 18 and 22 times the radial distance between an outer radial end of the claws of the rotor, and a inner radial end of the stator. For example, for a radial distance of 0.325 mm between an outer radial end of the claws of the rotor and an inner radial end of the stator, the width of the magnet is preferably between 5.85 and 7.15 mm.

For example, it is possible to provide a magnet with a circumferential width which is 20 times the radial distance between an outer end of the claws of the rotor and an inner end of the stator, i.e. a width of 6.5 mm, when the radial distance between an outer end of the claws of the rotor and an inner end of the stator is 0.325 mm.

The magnet can be made of rare earth material. For example, magnets of this type can be made of neodymium iron boron (NeFeB), or of ferrite.

In the rotor, in addition to the magnet, the magnetic assembly can comprise an element made of magnetic material.

This element, placed in the outer radial periphery of the magnetic assembly, makes it possible in particular to prevent the magnet from escaping by means of centrifugation, when the rotor is rotating.

In some embodiments, the element made of magnetic material is made of steel. In particular, this steel can be mild steel.

Thus, the element which is made of magnetic material provides good conduction of the magnetic flow of the magnet. This makes it possible to reinforce the structure mechanically, without restricting its magnetic functions of limitation of leakages of magnetic flow of the machine.

In addition, it is possible to provide an element made of magnetic material in the form of a plate with a slight radial thickness, arranged between two magnets.

Thus, the element which is made of magnetic material is easily saturated by the magnet, and the lines of magnetic field which are obtained from the magnet are not in danger of becoming confined in the volume of the magnetic element.

In a first embodiment, the magnet has a first recess according to an axial length, and this recess faces radially towards the interior of the rotor.

As a variant, the magnet has a second recess, again according to an axial length, but this time, this second recess faces radially towards the exterior of the rotor.

This first embodiment makes it possible to reduce the mass of magnet, whilst maintaining a large flat surface of contact with the polar claws.

According to a second embodiment, on the radial cross-sectional plane, the magnet has a profile which is in the form of the letter "U".

In this second embodiment, the magnet covers the element which can be either magnetic or made of a non-magnetic material, such as plastic for example, or can even be air. Thus, the claws are in direct contact with the magnet.

According to a variant of the second embodiment, the magnet has a profile on the radial cross-sectional plane which has the form of the letter "O". Thus, the element, which is or is not magnetic, is accommodated in the middle of the "O", and the mass of the magnet is distributed homogeneously within the magnetic assembly.

According to a third embodiment, on a radial cross-sectional plane, the magnetic assembly comprises a succession of several layers of magnet and several layers of magnetic material or non-magnetic material which alternate, and are superimposed according to a radial direction.

In this third embodiment, the mass of the magnet is reduced by using elements with simple geometry.

As a variant, the magnetic assembly consists of two magnets. A first magnet has globally the form of a parallelepiped. The second magnet has globally the form of a parallelepiped, a surface of which that faces towards the exterior bears a projection along its entire axial length. The magnet which bears the projection is in contact, by means of its face opposite the projection, and therefore its face which faces towards the interior, with the other magnet. The magnetic assembly is inserted in the interpolar gap, such that the projection extends according to an outer radial direction of the rotor, and in the direction of its radial end, into the end of the interpolar gap.

The second magnet, which has globally the form of a parallelepiped, a face of which bears the projection along its entire axial length, is made of ferrite material, the first magnet being made of rare earth material.

As well as reinforcing the function of reducing the leakages of magnetic flow of the magnetic assembly, this also makes it possible to limit the increase in cost in comparison with an interpolar magnet according to the prior art, by making the magnet which bears the projection from a material which is less costly than the material used for the other magnet. In fact, the production of the projection can generate losses of material. These losses are less costly if the magnet is made of a cheaper material. In addition, the production cost associated with the machining can be reduced.

As another variant, the magnetic assembly consists of two magnets and an element which is made of magnetic material. The element which is made of magnetic material is in the form of a thin plate which is disposed between the two magnets.

Thus, the mechanical strength of the magnetic assembly is reinforced. The advantages of the slight radial thickness of the plate are the same as those previously described.

The rotor according to the invention can be used in an alternator or an alternator-starter.

BRIEF DESCRIPTION OF THE DRAWINGS

The invention will be better understood by reading the following description, provided purely by way of example, and with reference to the appended drawings, in which:

FIG. 9 is a perspective view of two consecutive claws of a polar wheel according to a variant of the invention;

FIG. 10 is a perspective view of a claw of a first polar wheel imbricated between two consecutive claws of a second polar wheel according to a variant of the invention;

DETAILED DESCRIPTION

The examples are given with magnetic materials which could be replaced by non-magnetic materials.

The rotor according to the invention comprises at least one axis of symmetry. This axis corresponds to the axis of rotation of the rotor. In the present description, "axial direction" and "radial direction" thus mean directions as indicated by the arrows "A" and "R" respectively in FIG. 1.

Inner element also means an element which is on the axis side. Outer element also means an element which is on a side opposite the axis.

Figure 1:
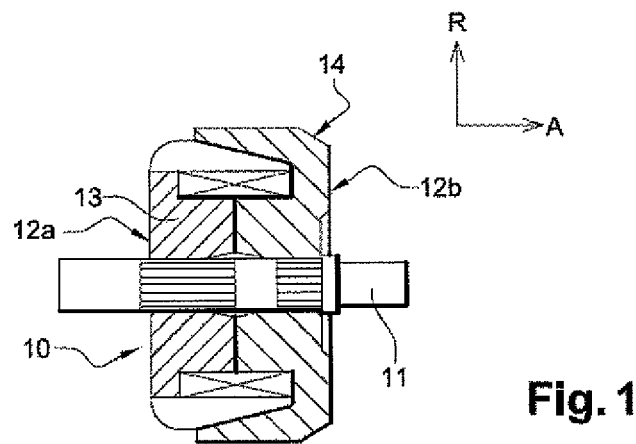
FIG. 1 is a view according to a longitudinal cross-sectional plane according to the invention.

FIG. 1 represents a rotor 10 of a known rotary electrical machine, such as an alternator of the polyphase type, for a motor vehicle with a thermal engine. It will be appreciated that the alternator can also be reversible, and can consist of an alternator starter which can function in alternator mode or in electric motor mode, in particular in order to start the thermal engine of the vehicle.

This machine comprises a rotor 10 which is integral in rotation with a central shaft 11, known as the rotor shaft, and a stator (not shown) which surrounds the rotor. In the example represented, the rotor 10 is produced in the form of a rotor with claws comprising two polar wheels 12a, 12b, which in this case are axially juxtaposed. Each wheel has a transverse flange 13 with an annular form. This transverse flange is provided on its outer periphery with polar claws 14 which extend substantially axially.

An annular gap exists between the outer peripheral face of the polar claws 14 and the inner periphery of the body of the stator. This gap corresponds to the radial distance between an outer end of the polar claws and an inner end of the stator.

The claws 14 have a transverse cross-section, i.e. on a cross-sectional plane perpendicular to the axis of the rotor, which has a globally trapezoidal or triangular form. The claws of each of the polar wheels 12a, 12b, face axially towards the flange 13 of the other polar wheel 12a, 12b. In addition, the claw 14 of one polar wheel 12a, 12b penetrates into the gap which exists between two adjacent claws 14 of the other polar wheel 12a, 12b. Thus, the claws 14 of the polar wheels 12a, 12b are imbricated.

Figure 2:
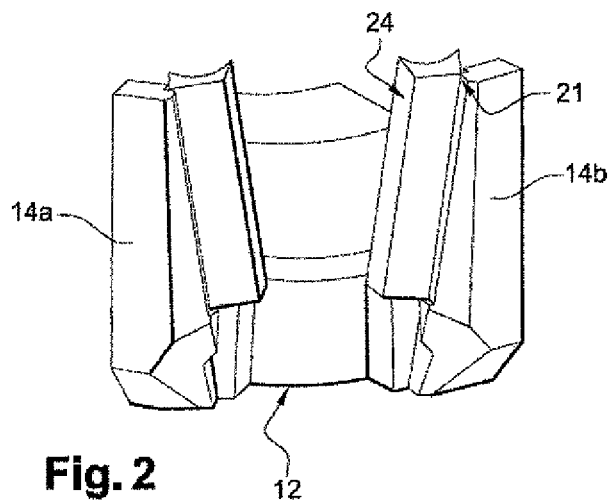
FIG. 2 is a perspective view of two consecutive claws of a polar wheel with a pair of magnetic assemblies according to the invention.

FIG. 2 shows axial grooves (or shoulders) 21 which are provided in the lateral surfaces of the claws 14 of the rotor 10. These claws belong to a single polar wheel 13. A magnetic assembly 24 is inserted in these grooves (or shoulders) such as to be in contact with both a claw 14 of a polar wheel, and with another imbricated claw of another polar wheel (not shown).

These grooves 21 are produced in a conventional manner with a milling cutter. For example, for a gap of 0.325 mm, the circumferential width of the magnetic assembly 24 is 6.5 mm. Thus, in this example, the width of the head of the milling cutter is then 6.5 mm.

Figure 3:
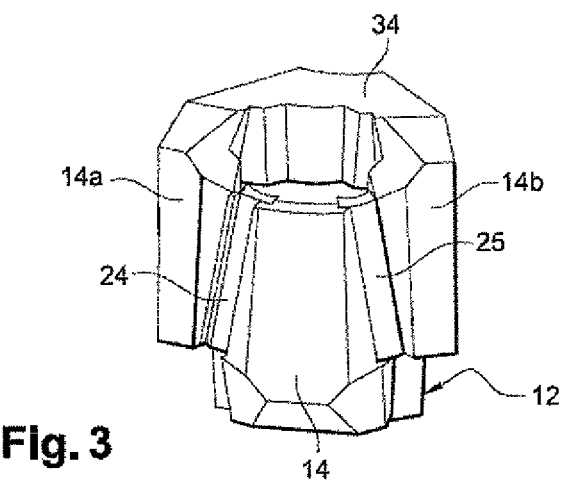
FIG. 3 is a perspective view of a claw of a first polar wheel imbricated between two consecutive claws of a second polar wheel with a pair of magnetic assemblies according to the invention.

FIG. 3 shows a claw 14 of a polar wheel 13 of the rotor 10, imbricated between two claws 14a, 14b of a polar wheel 12. Magnetic assemblies 24, 25 are inserted in the interpolar gaps.

Figure 4:
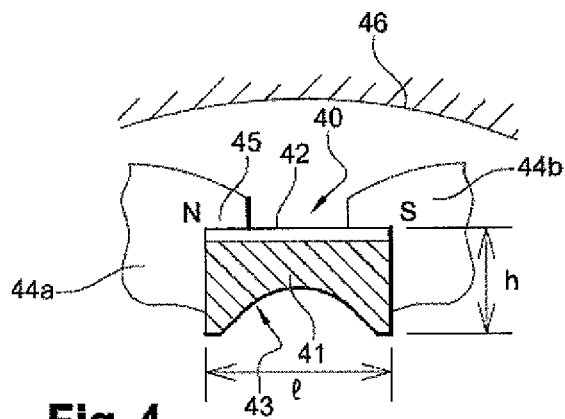
FIG. 4 is a view according to a radial cross-sectional plane of a magnetic assembly of the rotor according to a first embodiment.

In the first embodiment of the magnetic assembly 40 in FIG. 4, the magnetic assembly 40 consists both of a magnet 41 and an element made of magnetic material 42.

The magnet 41 is preferably made of rare earth material. For example, it can be obtained by moulding or machining a basic block (for example by milling). With reference to its implantation in the interpolar gaps of the rotor, the magnet 41 has a base in the form of a parallelepiped with an axial length L (not shown), with a circumferential width l, and a radial height h.

In this embodiment, on a face with dimensions L and l, the magnet is recessed along the entire axial length, from one end to the other.

On a radial cross-sectional plane, this recess 43 can have a profile which is semi-circular, elliptical or triangular, or it can have another shape. This recess can be centered relative to the face in which it is provided, or it can have another position. It can also have one or a plurality of recesses in the same face. The shape and dimensions of this recess depend in particular on the dimensions of the magnet, and/or on the mechanical properties of the material from which the magnet is produced. For example, the smaller the magnet, the greater care will be taken not to produce a recess which is too large. In fact, this would result in mechanical weakness at the level of the face opposite the recess.

The magnet shown in FIG. 4 has a semi-elliptical hollow, with the large axis of the ellipse being equal to the circumferential width l. However, a large axis with a smaller or larger axis could be adopted.

The circumferential width l of the magnet is between 18 and 22 times the dimension of the gap of the rotary electrical machine. Preferably, it is 20 times the dimension of the gap.

The magnetic element 42 is in the form of a plate with a slight radial thickness. The magnetic element is for example made of steel. Its radial thickness is quite small, so that it is saturated with magnetic flow by the magnet 41. This therefore prevents short-circuiting of the magnet 41.

The magnet 41 and the magnetic element 42 are held together by magnetisation.

The magnetic assembly 40 is inserted between the claws 44a and 44b in the grooves 45, such that the recess 43 in the magnet faces the interior of the rotor. In addition, it is inserted such that the north and south magnetic poles of the magnet are in contact with the claws 44a and 44b which have the same magnetic polarity.

For example, if the claw 44a corresponds to a north pole, the face of the magnet 41 which is in contact with the claw is also a north pole.

Thus, no magnetic flow can travel between the two claws 44a and 44b without travelling via the stator 46. In this embodiment, in a median region of the magnet, contrary to the interpolar magnets known in the state of the art, there is no unused volume to counter the leakages. Thus, the same functions are maintained, whilst removing an unnecessary mass of magnet which would be to the detriment of the mass of the rotor, its cost, and its mechanical strength. In fact, the magnetic element 42 and the broad contact surface provided between the magnet 41 and the claws 44a and 44b, make possible improved retention of the magnetic assembly 40 in the grooves 45. This prevents the magnetic assemblies from escaping by centrifugation during rotation of the rotor.

Figure 5:
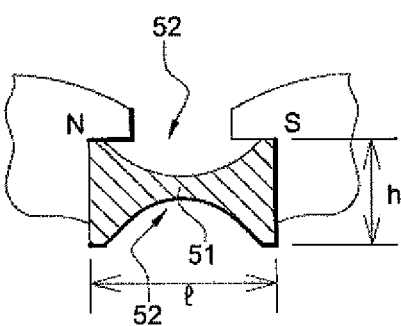
FIG. 5 is a view according to a radial cross-sectional plane of a magnetic assembly of the rotor according to a variant of the first embodiment.

FIG. 5 shows a variant of the first embodiment of the magnetic assembly. In this variant, the magnetic assembly consists of a single magnet 51.

The magnet 51 has two recesses 52, each on one of two opposite faces. The magnet shown in FIG. 5 has two identical recesses. However, it is possible to produce recesses of different types. For example, it is possible to produce a recess with large dimensions for the one facing towards the interior of the rotor, and a plurality of recesses with small dimensions for those facing towards the exterior. It is also possible to produce one recess which is elliptical, and another which is triangular.

This variant makes it possible to reduce further the mass of the magnet.

In this embodiment, the different elements which constitute the magnetic assembly have a simple geometry. They are therefore easy to produce.

Figure 6:
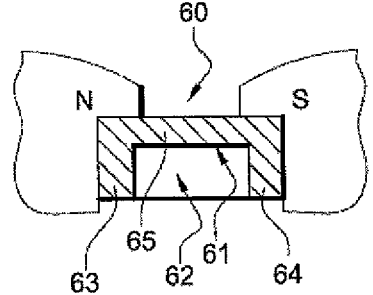
FIG. 6 is a view according to a radial cross-sectional plane of a magnetic assembly of the rotor according to a second embodiment.

In the second embodiment of the magnetic assembly in FIG. 6, the magnetic assembly 60 consists both of a magnet 61 and a magnetic element 62.

On a radial cross-sectional plane the magnet has a profile in the form of the letter "U". This "U" is formed by 3 straight segments, and the radial segments 63 and 64 are substantially perpendicular to the longitudinal segment 65.

The magnetic element 62 is in the form of a parallelepiped, and its dimensions are such that it can easily be inserted in the hollow of the "U".

The magnetic assembly 60 therefore has globally the form of a parallelepiped, and can thus easily be inserted between the grooves. The magnetic assembly presents to the claws faces which are constituted only by magnet, which improves its function of limitation of the magnetic leakages.

Figure 7:
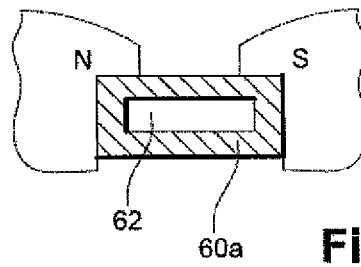
FIG. 7 is a view according to a radial cross-sectional plane of a magnetic assembly of the rotor according to a variant of the second embodiment.

As a variant, as shown in FIG. 7, the magnet 60a can have the form of the letter "O".

The magnet can be made in two parts, for example with two magnets which are joined by their ends, each having a profile in the form of a "U".

The magnetic element 62 is inserted in the middle of the "O".

In this variant, the distribution of the magnetic field lines obtained from the magnet is more balanced. Similarly, the mass of the magnetic assembly is better distributed.

Figure 8:
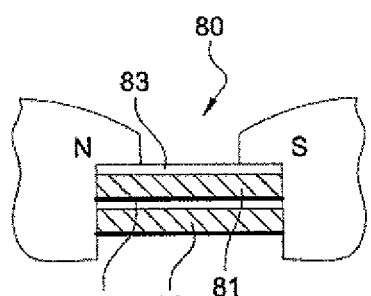
FIG. 8 is a view according to a radial cross-sectional plane of a magnetic assembly of the rotor according to a third embodiment.

In the third embodiment of the magnetic assembly in FIG. 8, the magnetic assembly 80 consists both of two magnets 81, 82 and two elements 83 and 84 made of magnetic material.

On a radial cross-sectional plane, the cross-section of the magnetic assembly 80 comprises an alternating succession of radial layers of magnet and magnetic material.

Thus, in FIG. 8, according to a radial direction, there is in succession a magnet 82 followed by an element 84 made of magnetic material, followed by another magnet 81, followed by a final element 83 made of magnetic material.

The magnets 81 and 82 have a globally parallelepiped form, and the elements 83, 84 which are made of magnetic material are thin plates.

FIG. 9 shows axial grooves (or shoulders) 21, each of which is provided in the lateral face of the claws 14 of the rotor. These claws belong to a single polar wheel 23. A magnetic assembly 24 is inserted in these grooves (or shoulders) such as to be in contact with both a claw 14 of a polar wheel, and with another imbricated claw of another polar wheel 34.

FIG. 10 shows a claw 14 of a polar wheel 23 of the rotor, imbricated between two claws 14a, 14b of another polar wheel 34. Magnetic assemblies 24a, 24b are inserted in the interpolar gaps.

Figure 11:
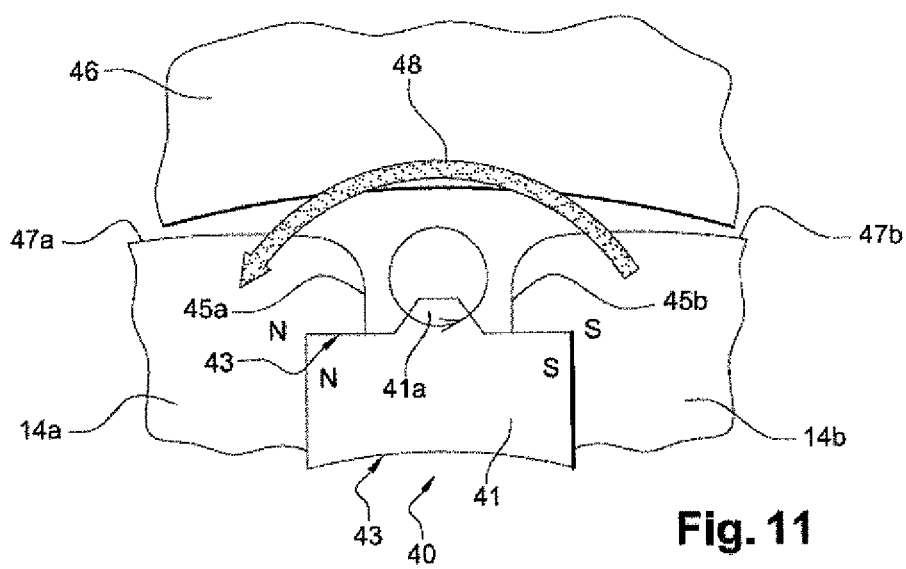
FIG. 11 is a view according to a radial cross-sectional plane of a magnetic assembly of the rotor according to another variant embodiment of the invention.

In the embodiment of the magnetic assembly 40 in FIG. 11, the magnetic assembly 40 consists of a single magnet 41. The magnet bears on one face a projection 41a, which extends radially towards the exterior of the rotor, i.e. in the direction opposite the axis.

The magnetic assembly is inserted between the claws 14a and 14b in the grooves 21, such that the projection 41a is positioned between the grooves 45a and 45b in the claws 14a and 14b. The projection 41a does not extend beyond the radial level of the outer face 47a, 47b of the polar claws 14. It is thus inserted such that the north and south magnetic poles of the magnet are in contact with the claws 14a and 14b with the same magnetic polarity. For example, if the claw 14a corresponds to a north pole, the face of the magnet 41 which is in contact with the claw is also a north pole.

Thus, when a magnetic flow line 48 escapes from a groove 45b towards the groove 45a, by means of magnetisation the projection 41a acts such as to displace the leakage path of the flow line 48 to make it pass via the stator 46. This flow 48, which would be lost without the presence of the projection 41a, can thus participate in the functioning of the electrical machine.

Figure 12:
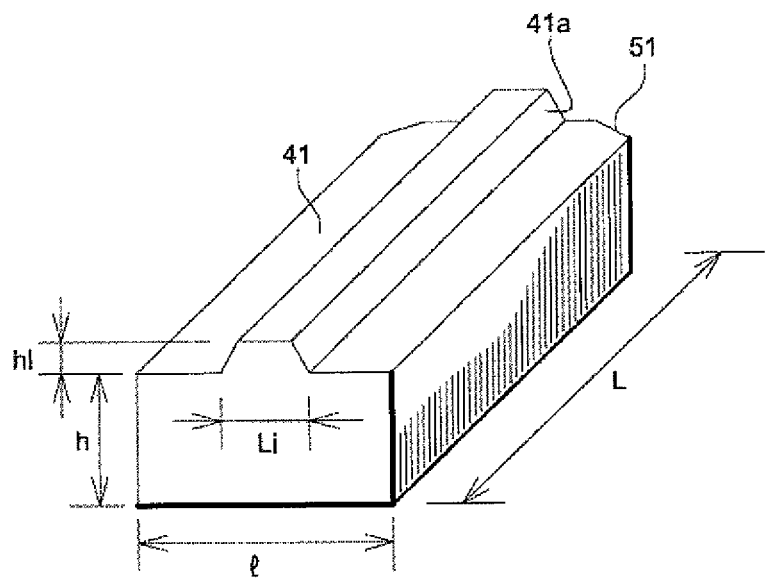
FIG. 12 is a perspective view of the magnet in FIG. 11.

A magnet 41 which can be used in this embodiment is shown in FIG. 12, with its characteristic values.

This is a magnet which is preferably made of rare earths. For example, it can be obtained by moulding, or by machining a basic block. The magnet 41 has a base substantially in the form of a parallelepiped with an axial length L, a width which is measured circumferentially l, and a radial height h. This radial height h is not the height of the magnet, since the magnet 41 bears, on one of its faces with dimensions l and L, a projection 42 which extends radially towards the exterior of the rotor.

In this case, the projection 41a is centered on a face with dimensions l and L. However, this position can be different. It can be eccentric.

The projection 41a has a width measured circumferentially li and a radial height hi. Since it is designed to be positioned between the grooves 45 in the claws, it has dimensions which conform to the dimensions of these grooves 45, and in particular to the distance measured circumferentially between these grooves. Ideally, its width hi is such that it reaches or approaches the radial level of the outer face 47a, 47b of the claws, without however extending beyond this level, in order to preserve the gap.

In particular, it will be ensured that a radial height of the projection 41a is selected which makes it possible to prevent the projection from coming into contact with the stator 46.

The projection 41a can have a radial profile which is semi-circular, semi-elliptical, triangular, or it can have another profile. In the embodiment in FIG. 12, the projection has a trapezoidal profile.

Figure 13:
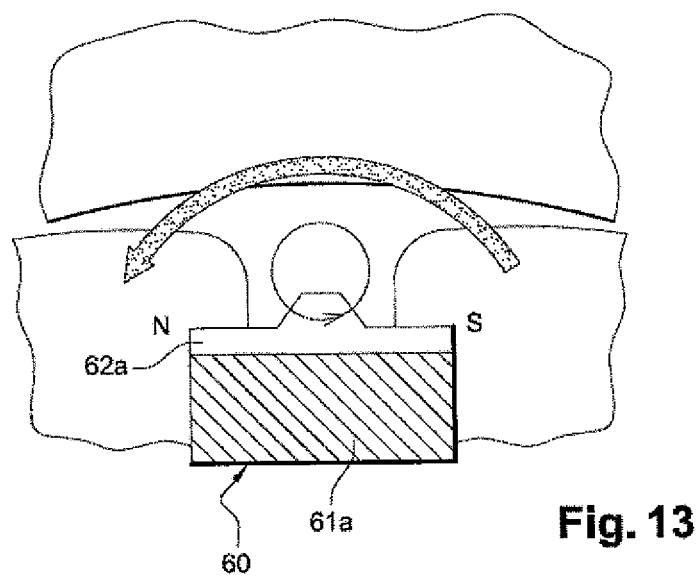
FIG. 13 is a view according to a radial cross-sectional plane of a magnetic assembly of the rotor according to a first variant of the embodiment in FIG. 11.

As a variant, it is possible to provide a magnetic assembly 60 comprising two magnets 61a, 62a, as shown in FIG. 13.

The magnet 61a has globally the form of a parallelepiped. The magnet 62a, for its part, is similar to that described in FIG. 12.

The dimensions of the magnets 61a, 62a are selected such that they can be superimposed. In addition, securing means, such as glue for example, are provided in order to keep them in contact.

Because of its simple geometric form, the magnet 61a is easier to produce. In addition, it is this magnet which makes it possible to counter most of the magnetic flow which attempts to pass from one claw to the other, without passing via the stator. Consequently, this magnet is made of a material which is efficient for this use. For example, the magnet 61a is made of rare earths.

The magnet 62a has a more complex geometric form than that of the magnet 61a. Thus, its production can generate losses of material. In order to limit the cost of these losses, the magnet 62a can be made of ferrites.

Similarly, it is possible to adapt the choice of material for the two magnets according to the mechanical stresses to which they are subjected during their production or use.

Figure 14:
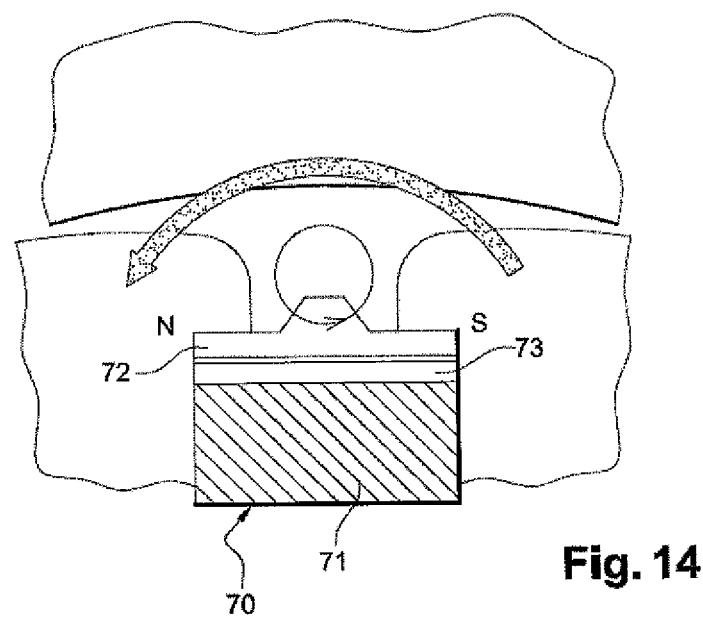
FIG. 14 is a view according to a radial cross-sectional plane of a magnetic assembly of the rotor according to a second variant of the embodiment in FIG. 11.

Also as a variant, it is possible to provide a magnetic assembly 70 comprising two magnets 71, 72, as well as the magnetic element 73. An assembly of this type is shown in FIG. 14.

The magnetic element 73 is in the form of a plate with a slight radial thickness. The magnetic element 73 is made of steel, for example. Its radial thickness is quite small, so that it is saturated with magnetic flow by the magnets 71, 72. This therefore prevents the magnets from being short-circuited.

The magnets are retained on the magnetic element by means of magnetisation. It is possible to provide additional securing means such as glue.

In all the embodiments of the magnetic assembly according to the invention, the face opposite the exterior of the rotor can have striations. These striations can be applied to all the forms of the magnetic assembly which have a face opposite the exterior of the rotor. These striations improve the performance of the alternator, by reducing the leakages by Foucault current which develop on the surface of the magnetic assemblies.

The magnets, as well as the elements which are made of magnetic material, have the same circumferential and longitudinal dimensions. However, the radial height of the magnetic elements is quite low in comparison with the radial height of the magnets. Thus, the elements which are made of magnetic material are easily saturated by the magnetic field lines obtained from the magnets.

In all the embodiments of the magnetic assembly, the face opposite the exterior of the rotor can have striations. These striations can be applied to all the forms of the magnetic element which have a face opposite the exterior of the rotor. These striations improve the performance of the alternator, by reducing the leakages by Foucault current which develop on the surface of the magnetic assemblies.

The fitting of the assembly in the grooves can be facilitated by rounding one of its ends opposite the exterior of the rotor. The magnetic assembly can also be rounded on its part opposite the interior of the rotor. This rounded part can be produced irrespective of the form of the magnetic assembly. Thus, the magnetic assemblies can be inserted in an automated manner. Instead of the ends being rounded, they can be beveled.

A description will now be provided of the fitting of the assemblies in the interpolar areas of the claws of the alternator or the alternator-starter.

Machining of the claws is carried out in the interpolar area by means of a conventional milling cutter, in order to provide a groove on each side of the interpolar area.

One embodiment can consist of fitting the non-magnetised magnets together with the magnetic element in order to constitute the magnetic assembly, and then magnetising the magnets. This last solution has the advantage of being able to manipulate non-magnetised magnetic elements during the assembly, thus eliminating the constraints which are associated with magnetised materials.

The assembly is then inserted between the grooves. This insertion can be carried out more easily automatically if one of the ends of the assembly is rounded or beveled.

It will be appreciated that the present invention is not limited to the embodiments previously described by way of example; it extends to other variants.

By reading the present description, it will be understood that many embodiments of the invention are possible. In particular, it is possible to combine several of the above-described embodiments. For example, it is possible to produce a magnetic assembly consisting of radial stacking of layers of magnet and magnetic material, whilst using a magnet with a recess, or by varying the forms and dimensions of the projection.

In addition, for the profiles of the recesses, it is possible to produce curved or well-segmented profiles. For this purpose, it will be noted that many magnets in the form of polyhedrons and non-polyhedrons are possible, in particular the forms which have a concave profile on the radial cross-sectional plane.

It is also possible to use one magnet, or two or three, or even more. It is also possible to use one element which is made of magnetic material, or two or three, or even more.

One embodiment of the present invention can also consist of producing a magnetic assembly with a recess which is produced by combination of particular forms of magnet, without using magnets with a recess.

The invention claimed is:

1. A rotor for a rotary electrical machine, the rotor being rotatable around an axis, the rotor comprising:
   two polar wheels, each having a series of polar claws extending in an axial direction, and having a substantially trapezoidal cross-section on a plane perpendicular to the axis, the polar claws extending from an outer radial end of one of the polar wheels in the direction of the other polar wheel, the polar wheels being arranged such that each claw of the polar wheel is situated in one of interpolar gaps existing between two consecutive polar claws of the other polar wheel; and
   magnetic assemblies each arranged respectively in at least one of the interpolar gaps, at least one of the magnetic assemblies comprising a first magnet and a second magnet superimposed in a radial direction;
   the at least one of the magnetic assemblies further comprising at least one magnetic element made of magnetic material and disposed between the first and second magnets;
   the at least one magnetic element being a plate with a slight radial thickness.

2. The rotor according to claim 1, wherein at least one of the magnetic assemblies has at least one recess which extends in an axial direction.

3. The rotor according to claim 1, wherein at least one of the first and second magnets is made of rare earth material.

4. The rotor according to claim 1, wherein at least one of the first and second magnets is made of ferrite material.

5. The rotor according to claim 1, wherein the first magnet has a recess which extends in an axial direction and faces radially towards the interior of the rotor.

6. The rotor according to claim 1, wherein the first and second magnets are made of different materials.

7. An alternator comprising a rotor according to claim 1.

8. An alternator-starter comprising a rotor according to claim 1.

9. A rotor for a rotary electrical machine, the rotor being rotatable around an axis, the rotor comprising:
   two polar wheels, each having a series of polar claws extending in an axial direction, and having a substantially trapezoidal cross-section on a plane perpendicular to the axis, the polar claws extending from an outer radial end of one of the polar wheels in the direction of the other polar wheel, the polar wheels being arranged such that each claw of the polar wheel is situated in one of interpolar gaps existing between two consecutive polar claws of the other polar wheel; and
   magnetic assemblies each arranged respectively in at least one of the interpolar gaps, at least one of the magnetic assemblies comprising a first magnet and a second magnet superimposed in a radial direction;
   each of the polar claws including an axial groove provided in lateral surfaces of the polar claws;
   at least one of the magnetic assemblies comprising a projection which extends radially in the interpolar gap beyond the groove, towards an outer radial end of the rotor, without going beyond the radial level of an outer face of the polar claws.

10. The rotor according to claim 9, wherein the rotary electrical machine further includes a stator provided around the rotor; and wherein at least one of the magnetic assemblies has a circumferential width of between 18 and 22 times the radial distance between an outer radial end of the claws of the rotor, and an inner radial end of the stator.

11. The rotor according to claim 9, wherein the second magnet has a recess which extends in an axial direction and faces radially towards the exterior of the rotor.

12. The rotor according to claim 9, wherein the first magnet which bears the projection is made of ferrite material, and the second magnet is made of rare earth material.

13. A rotor for a rotary electrical machine, the rotor being rotatable around an axis, the rotor comprising:

two polar wheels, each having a series of polar claws extending in an axial direction, and having a substantially trapezoidal cross-section on a plane perpendicular to the axis, the polar claws extending from an outer radial end of one of the polar wheels in the direction of the other polar wheel, the polar wheels being arranged such that each claw of the polar wheel is situated in one of interpolar gaps existing between two consecutive polar claws of the other polar wheel; and magnetic assemblies each arranged respectively in at least one of the interpolar gaps, at least one of the magnetic assemblies comprising a first magnet and a second magnet superimposed in a radial direction;

at least one of the magnetic assemblies further comprising at least one magnetic element made of steel and disposed between the first and second magnets.

* * * * *